United States Patent Office 3,759,839
Patented Sept. 18, 1973

3,759,839
PROCESS FOR THE MANUFACTURE OF A PALLADIUM CATALYST
Hans Fernholz, Fischbach, Taunus, Hans-Joachim Schmidt, Frankfurt am Main, and Friedrich Wunder, Florsheim am Main, Germany, assignors to Farbwerke Hoechst Aktiengesellschaft vormals Meister Lucius & Bruning, Frankfurt am Main, Germany
No Drawing. Continuation of abandoned application Ser. No. 777,898, Nov. 21, 1968. This application Feb. 22, 1971, Ser. No. 117,694
Claims priority, application Germany, Dec. 2, 1967, F 54,191
Int. Cl. B01j *11/12*
U.S. Cl. 252—431 C    12 Claims

ABSTRACT OF THE DISCLOSURE

A carrier catalyst containing palladium carboxylate which is suitable for the alkenylation of carboxylic acids with olefins in the gaseous phase is manufactured by impregnating the carrier with a solution containing a palladium carboxylate, drying the impregnated carrier at temperatures below 120° C. and evaporating the solvent to a residual content of less than 20% by weight.

---

The present invention relates to a process for the manufacture of a palladium catalyst.

It has already been proposed to use catalysts which contain nonvalent, elementary or bivalent palladium for the alkenylation of carboxylic acids with olefins in the gaseous phase, for example, for the manufacture of vinyl acetate from ethylene, acetic acid and molecular oxygen. The catalysts containing elementary palladium are generally obtained by impregnating an appropriate carrier material with the solution of a palladium salt and then reducing the palladium salt in the liquid or gaseous phase. The activity and effectiveness of such palladium metal catalysts depend substantially on the nature of the reducing agent and the reduction conditions used. As such catalysts require, in addition to palladium, also other substances acting as moderators or oxygen carriers, the carrier must be impregnated with the solution of one or several of these substances in a further process stage after the reduction. Just as complicated is the production of an alkenylation catalyst containing bivalent palladium in the form of its oxide. It has been described, for example, slowly to heat the carrier material which has been impregnated with a palladium salt solution up to a temperature of 500° C. in the presence of air or first to treat it at 100° C. with hydrogen and then to oxidize the elementary palladium formed in an oxygen stream at a temperature within the range of from 750 to 820° C. In this case, too, it is advantageous to subsequently impregnate the carrier with the solution of a substance or substance mixture having a co-catalytic action.

Much simpler is the manufacture of a catalyst in which the palladium is present in a bivalent form as a salt or a salt-like compound. This kind of manufacture can be carried out in a simple manner by impregnating the carrier material with a solution which, in addition to the palladium salt, also contains the necessary additional components. For example, the highly effective catalyst described in Belgian Pat. 711,618 can be obtained by impregnating the carrier material, preferably silicic acid, with a solution containing palladium acetate, alkali metal acetate, cadmium acetate and optionally iron acetate or another redox system suitable as oxygen carrier and then drying it. Such palladium acetate catalysts are furthermore distinguished by the fact that a high activity and selectivity is obtained with relatively small amounts of noble metal, which may be due to a particularly favorable distribution of the active substances on or in the carrier material.

Now we have found that the effectiveness of a palladium acetate catalyst depends on the manufacturing process, the drying operation being of decisive importance. This is on the one hand due to the palladium acetate's being thermally unstable and forming more or less elementary palladium at elevated temperatures, which impairs particularly the selectivity of the catalyst, this being surprising. The influence of the drying operation on the effectiveness of the catalyst may, on the other hand, be attributed to the fact that determined residual amounts of solvent appreciably reduce the activity and life of the catalyst. This is also very surprising, especially since the activity and life are also reduced when acetic acid is used as the solvent as is the case in the reaction of ethylene with acetic acid and molecular oxygen to vinyl acetate in the gaseous phase. Similar observations were made in the case of salts of palladium with higher carboxylic acids, for example, palladium propionate, palladium butyrate and palladium isobutyrate.

The present invention provides a process for the manufacture of a carrier catalyst containing palladium carboxylate which is suitable for the alkenylation of carboxylic acids with olefins in the gaseous phase, which comprises impregnating the carrier with a solution containing a palladium carboxylate, drying at temperatures below 120° C., preferably below 80° C., and evaporating the solvent to a residual content of less than 20% by weight, preferably less than 6% by weight.

As palladium carboxylate it is advantageous to use palladium acetate, especially when the catalyst is intended for use in the reaction of ethylene with acetic acid to vinyl acetate. If the carboxylic acid to be alkenylated is not acetic acid but another acid suited for the reaction in the gaseous phase there may also be used, in principle, palladium salts derived from the said carboxylic acid.

The impregnation may be carried out by covering the carrier material with a layer of the palladium carboxylate solution and then pouring or filtering off the solution in excess. In view of losses of solvent it is advantageous, however, to use only such an amount of solvent as corresponds to the integral pore volume of the catalyst carrier and then to mix thoroughly until all particles of the carrier material have been wetted uniformly. This thorough mixing may be brought about, for example, by stirring. Impregnation and mixing are preferably carried out simultaneously, for example, in a rotary drum or a tumbling mixer, and may be followed immediately by the drying operation.

The amount and composition of the palladium carboxylate solution to be used for impregnating the carrier material are advantageously such that the amount of solution corresponds to the pore volume of the catalyst carrier and that the desired amount of active substances is applied by a single impregnation.

The drying process which may be performed at temperatures within the range of from 120° to 0° C., in special cases at even lower temperatures, is preferably carried out under reduced pressure. It is furthermore advantageous to perform it in a stream of inert gas, for example, a stream of nitrogen or carbon dioxide.

The solution to be used for impregnating the carrier and consequently also the resulting catalyst advantageously contain, in addition to palladium carboxylate, also salts of alkali metals and/or alkaline earth metals and/or cadmium. These act as activators and/or oxygen carriers. Also, the solution advantageously contains salts of metals capable of reversibly changing their valency stage, these salts acting as oxygen carriers or redox systems. Exemplary of such salts are the acetates of copper, manganese, iron, cobalt, cerium and uranium which are readily available. Salts which are particularly well soluble in the palladium salt solution to be used for impregnating the carrier material are especially suitable. If the carboxylic acid to be alkenylated is used as solvent there may also be used the carbonates, oxides, hydroxides or other compounds from which the salts corresponding to the carboxylic acid are formed "in situ." The addition of such metal salts may be dispensed with if the carrier material, as is often the case, contains the metals capable of changing their valency in a form in which they act as oxygen carriers or may pass at least partially under the reaction conditions into the salt of the acid to be alkenylated. When the carrier material is for example a silicic acid containing 0.004 to 1% by weight iron, the further addition of a redox component may be dispensed with. The content of redox metal in the palladium catalyst is advantageously below 5% by weight, preferably within the range of from 0.002 to 2% by weight.

The above additional metal salts, also the salts of the metals of groups 1 and 2 of the Mendeleeff Periodic Table mentioned hereinbefore, advantageously have the same anion as the palladium carboxylate. If the carboxylic acid to be alkenylated is not acetic acid but a higher carboxylic acid, it is also possible, as already stated above for the palladium carboxylates, to use the salts of the addition metals derived from the said higher carboxylic acid. As these salts, however, are capable of being formed under the alkylenation conditions by the introduction of the carboxylic acid in vapor form, that is "in situ," it is more advantageous to use offhand the more easily accessible acetates.

Particularly good results are obtained with catalysts containing 0.05 to 3% by weight, preferably 0.1 to 1.5% by weight, palladium, 0.4 to 12% by weight, preferably 1 to 5% by weight, alkali and 0.1 to 15% by weight, preferably 1 to 5% by weight, cadmium. Such catalysts can be obtained, for example, by impregnating a carrier having a pore volume of, for example, 0.825 ml./g. with a solution containing 0.6 to 2.5% palladium acetate, 2.3 to 8.5% cadmium acetate and 3.6 to 12% potassium acetate.

As carrier material there may be used carbon, alumina, silicates, for example, calcined clay or aluminosilicates, silica gel, silicon carbide, zirconium and other inert substances. The carriers advantageously have a specific surface within the range of from 1 to 1000 m.$^2$/g., preferably from 20 to 300 m.$^2$/g., and a mean pore radius within the range of from 5 to 2000 A. A silicic acid having a specific surface within the range of from 40 to 300 m.$^2$/g. and a mean pore radius within the range of from 50 to 600 A. has proved particularly advantageous. As fluidized bed catalysts, microspheroidal carriers having grain sizes within the range of from 0.1 to 0.6 mm. are advantageougsly used.

For the preparation of the palladium salt solution to be used for impregnating the carrier material, any solvent may be used that is inert to the substances used for the reaction and that is capable of dissolving the palladium carboxylate and the salts additionally used. Examples of suitable solevnts are water, ketones, for example, acetone, tetrahydrofurane and dioxane, low alkanols, for example, methanol and ethanol, furthermore benzene and the mixtures thereof. There may also be used carboxylic acids of the aliphatic, cyclo-aliphatic, araliphatic or aromatic series with less than 10 carbon atoms in the molecule, which are suitable for the alkenylation in the gaseous phase and can evaporated under the reaction conditions. Saturated fatty acids with 2 to 4 carbon atoms in the molecule, that is propionic acid, n- or isobutyric acid and above all acetic acid, are preferably used.

The following examples serve to illustrate the invention, but are not intended to limit it thereto. The term "selectivity" is used in the examples to mean the weight of the reacted ethylene that has been reacted with carboxylic acid to vinyl ester. (The remaining part of the ethylene which had undergone reaction had substantially been reacted to carbon dioxide and water.)

COMPARISON EXAMPLE 1,455 g. (3 l.) of a silicic acid carrier having a surface of 120 m.$^2$/g., a pore volume of 0.825 ml./g., a mean pore radious of 100 A. and an apparent density of 0.5 g./ml. were impregnated with a soltuion of 23.2 g. palladium acetate, 60 g. potassium acetate, 60 g. cadmium acetate and 1.6 g. iron acetate in 1100 cc. acetic acid. Over this catalyst which was not dried, 2,100 Nl. (N meaning under normal condition of temperature and pressure) ethylene, 2,100 g. acetic acid and 1,400 Nl. air were passed, per hour, at 165° C. and 4 atmospheres gage. The space-time yield was 12 g. vinyl acetate per liter and per hour.

EXAMPLES 1–6

The catalyst prepared as described in the comparison example was dried and then subjected to the reaction described in the comparison example under the conditions of that example. The drying of the catalyst was carried out in a stream of nitrogen under 100 mm. of mercury under the same conditions but while varying the drying temperatures and degrees of drying, measured by the amount of acetic acid still present at the end of the drying. The following table indicates the effectiveness and selectivity of the catalyst as a function of the drying conditions. The corresponding values of the comparison example are also shown in the table for the sake of clearness.

TABLE

| Example | Drying temperature, ° C. | Residual acetic acid Grams | Residual acetic acid Percent | Space-time yield (g./l. hr. vinyl acetate) | Selectivity (percent by weight of ethylene reacted to vinyl acetate) |
| --- | --- | --- | --- | --- | --- |
| Comparison Ex. | No drying | 1,160 | 42 | 12 | |
| 1 | 80 | 290 | 18.5 | 43 | Not measured. |
| 2 | 80 | 94 | 6 | 142 | 91. |
| 3 | 80 | 3 | 0.2 | 143 | 86. |
| 4 | 120 | 0 | 0 | 138 | 83. |
| 5 | 50 | 29 | 1.8 | 210 | 94. |
| 6 | 40 | 54 | 3.4 | 200 | 95. |

EXAMPLE 7

1200 g. of a silica gel having an apparent density of 0.4 g./ml., a pore volume of 0.990 ml./g. and an iron content of 0.1% were impregnated with a solution of 19.8 g. palladium acetate, 60 g. cadimum acetate and 60 g. potassium acetate in 1,050 ml. acetic acid and dried at 50° C. under 100 mm. of mercury in a stream of nitrogen until 74 g. acetic acid were still present in the catalyst. By using the same test conditions as described in the comparison example a space-time yield of 204 g. vinyl acetate per hour and a selectivity of 93% were obtained.

Analogous results were obtained in tests carried out with methanol as solvent, with propylene as olefin and/or with propionic acid as carboxylic acid.

What is claimed is:

1. In a process for the manufacture of a carrier catalyst containing palladium carboxylate which is suitable for the alkenylation of carboxylic acids with olefins in gaseous phase, the improvement of which comprises impregnating the carrier with a solvent solution of a carboxylic acid containing a palladium carboxylate, drying the impregnated carrier at temperatures below 80° C. and evaporating the solvent to a residual solvent content of 6% or less by weight.

2. The process as defined in claim 1 and wherein the solvent is a carboxylic acid of less than 10 carbon atoms in the molecule.

3. The process as defined in claim 1 and wherein the solvent is a fatty acid of 2 to 4 carbon atoms in the molecule.

4. The process as defined in claim 1 and wherein the solvent is acetic acid.

5. The process as defined in claim 1 and wherein the palladium carboxylate is palladium acetate.

6. The process as defined in claim 1 and wherein such an amount of solvent is used for impregnating the carrier as corresponds to the integral pore volume of the carrier.

7. The process as defined in claim 1 and wherein drying is carried out under reduced pressure and in a stream of gas which is inert to the catalyst.

8. The process as defined in claim 1 and wherein the solution additionally contains a member selected from the group consisting of an alkali metal salt, a cadimum salt and mixtures thereof and wherein the anion is acetate, propionate, butyrate or isobutyrate.

9. The process as defined in claim 1 and wherein the solution contains a metal salt redox system wherein the metal salt is an acetate, a propionate, butyrate or isobutyrate of copper, manganese, iron, cobalt, cerium or uranium.

10. The process as defined in claim 1 and wherein the solvent is the carboxylic acid to be alkylenated.

11. The process as defined in claim 1 and wherein the carrier is a silicic acid having a specific surface within the range of from 20 to 300 m.$^2$/g., a mean pore radius within the range of from 5 to 2000 A. and an iron content within the range of from 0.004 to 1% by weight.

12. The process as defined in claim 1 and wherein a carrier having a microspheroidal grain size within the range of from 0.1 to 0.6 mm. is used as carrier for fluidized bed catalysts.

References Cited

FOREIGN PATENTS 1,407,526   6/1965   France _____ 260—497 A

DANIEL E. WYMAN, Primary Examiner

W. J. SHINE, Assistant Examiner

U.S. Cl. X.R.

260—497 A